United States Patent
Cimponeriu (10) Patent No.: US 9,835,432 B2
(45) Date of Patent: Dec. 5, 2017

(54) METHOD AND SYSTEM FOR DETERMINING A ROTATION ANGLE OF AT LEAST ONE WHEEL OF A VEHICLE

(71) Applicant: CONTINENTAL AUTOMOTIVE GMBH, Hannover (DE)

(72) Inventor: Andrei Cimponeriu, Timisoara (RO)

(73) Assignee: Continental Automotive GmbH, Hannover (DE)

( * ) Notice: Subject to any disclaimer, the term of this patent is extended or adjusted under 35 U.S.C. 154(b) by 111 days.

(21) Appl. No.: 14/844,205

(22) Filed: Sep. 3, 2015

(65) Prior Publication Data

US 2016/0059646 A1    Mar. 3, 2016

(30) Foreign Application Priority Data

Sep. 3, 2014 (EP) .................... 14465521
Mar. 19, 2015 (GB) .................. 1504657.6

(51) Int. Cl.
*B60C 23/04* (2006.01)
*G01B 5/00* (2006.01)

(52) U.S. Cl.
CPC ............ *G01B 5/00* (2013.01); *B60C 23/0416* (2013.01); *B60C 23/0477* (2013.01); *B60C 23/0474* (2013.01)

(58) Field of Classification Search
CPC ............ B60C 23/0474; B60C 23/0477; B60C 23/0416
See application file for complete search history.

(56) References Cited

U.S. PATENT DOCUMENTS

| | | | |
|---|---|---|---|
| 5,604,482 A * | 2/1997 | Majeed | B60C 23/06 340/442 |
| 6,385,511 B1 * | 5/2002 | Fondeur | B60C 23/0416 340/447 |
| 7,119,670 B2 | 10/2006 | Hammerschmidt | |
| 7,203,579 B2 | 4/2007 | Yokota et al. | |
| 7,313,953 B2 | 1/2008 | Hernando et al. | |
| 8,397,558 B2 | 3/2013 | Koguchi et al. | |
| 2005/0081615 A1 * | 4/2005 | Stewart | B60C 23/0408 73/146 |
| 2007/0074566 A1 | 4/2007 | Roundy et al. | |
| 2013/0179113 A1 | 7/2013 | Guinart | |
| 2013/0274988 A1 | 10/2013 | Reynes | |
| 2014/0176323 A1 * | 6/2014 | Kim | B60C 23/0408 340/442 |

(Continued)

FOREIGN PATENT DOCUMENTS

| | | |
|---|---|---|
| DE | 10342297 A1 | 4/2005 |
| DE | 102013211152 A1 | 12/2014 |
| EP | 1457388 A1 | 9/2004 |

(Continued)

*Primary Examiner* — R. A. Smith
*Assistant Examiner* — John M Royston
(74) *Attorney, Agent, or Firm* — Laurence A. Greenberg; Werner H. Stemer; Ralph E. Locher (57) ABSTRACT

A rotation angle of at least one wheel of a vehicle is determined during an operation of the vehicle. The method includes acquiring a plurality of pressure values of a tire pressure of the at least one wheel by way of a tire pressure sensor, and determining a rotation angle of the at least one wheel by determining a change of the pressure of the tire based on the acquired plurality of pressure values.

15 Claims, 5 Drawing Sheets

(56) References Cited

U.S. PATENT DOCUMENTS

2014/0184403 A1* 7/2014 Kosugi ............... B60C 23/0416
                                                    340/447
2014/0195104 A1* 7/2014 Hammerschmidt .. B60C 23/062
                                                    701/32.7

FOREIGN PATENT DOCUMENTS

| EP | 2426475 A1 | 3/2012 |
|---|---|---|
| FR | 2986185 A1 | 8/2013 |
| JP | 2010122023 A | 6/2010 |
| JP | 2013082436 A | 5/2013 |
| KR | 101363058 B1 | 2/2014 |
| WO | 03051652 A1 | 6/2003 |
| WO | 03080371 A2 | 10/2003 |
| WO | 2014198785 A1 | 12/2014 |

* cited by examiner

METHOD AND SYSTEM FOR DETERMINING A ROTATION ANGLE OF AT LEAST ONE WHEEL OF A VEHICLE

CROSS-REFERENCE TO RELATED APPLICATION

This application claims the priority, under 35 U.S.C. §119, of European patent application EP 14465521, filed Sep. 3, 2014, and of British patent application GB 1504657.6, filed Mar. 19, 2015; the prior applications are herewith incorporated by reference in their entirety.

BACKGROUND OF THE INVENTION

Field of the Invention

The present application relates to a method for determining a rotation angle of at least one wheel of a vehicle during an operation of the vehicle. The application also pertains to a computer program product and a system for determining a rotation angle of at least one wheel of a vehicle during an operation of the vehicle.

Tire pressure monitoring systems (TPMS) have been developed which include tire pressure sensors allocated to each wheel. The tire pressure sensors measure the tire pressure of the vehicle tires and the TPMS announces at least a critical deviation from a desired tire pressure to a driver of the vehicle. Moreover, sensors being used for measuring parameters such as the temperature of the tires may be fitted on the wheels, with the aim of informing the driver of any abnormal values in the measured parameters.

Further, TPMSs are typically provided on one hand with electronic modules, also called wheel units (WUs), mounted on each wheel of the vehicle and an electronic control unit, mounted on the vehicle, for receiving the signals sent by the WUs.

The signals received by the electronic control unit are typically to be associated with its corresponding WU. This requirement remains present throughout the life of the vehicle, in particular after wheel changes or after the rotation of the wheel positions. Performing this association is known in TPMSs as localization.

One method to perform localization is based on the correlation between the emission time of the wheel units and the angle of the wheels at the time of emission. In this localization method, the WU emissions are typically performed at prescribed positions. To this end, a transducer is arranged within the WU, which provides angular information so that emissions are performed at known rotation angles.

Angular information within the WU may be obtained by using a rotation sensor, for instance a flexural element that is bent by gravity.

Commonly assigned, published patent application US 2013/0179113 A1 discloses a method for TPMS localization, wherein the angular information within the WU is obtained by using an accelerometer.

SUMMARY OF THE INVENTION

It is an object of the present invention to provide a method for determining a rotation angle of at least one wheel of a vehicle during an operation of the vehicle, a computer program product and a system for determining a rotation angle of at least one wheel of a vehicle during an operation of the vehicle without the need of an additional sensor other than a tire pressure sensor.

With the above and other objects in view there is provided, in accordance with the invention, a method of determining a rotation angle of at least one wheel of a vehicle during an operation of the vehicle. The novel method comprises the following steps:

acquiring, with a tire pressure sensor, a plurality of pressure values of a pressure in a tire of the at least one wheel; and determining a rotation angle of the at least one wheel by determining a change of a pressure in the tire based on the determined plurality of pressure values.

In other words, according to one aspect of the present invention, a method is provided for determining a rotation angle of at least one wheel of a vehicle during an operation of the vehicle, in particular during a movement of the vehicle. Therein, the method comprises the steps of determining a plurality of pressure values of a pressure of a tire of the at least one wheel by a tire pressure sensor and determining a rotation angle of the at least one wheel by determining a change of the pressure of the tire based on the determined plurality of pressure values.

As used herein, the term "rotation angle" means any information that is suitable to characterize the rotational position of the at least one wheel with respect to a reference arm, i.e. a reference line enclosing an angle with a further line. The terms "rotation angle information" or "rotational position" may therefore be used synonymously and interchangeably with the term "rotation angle".

Figure 1:
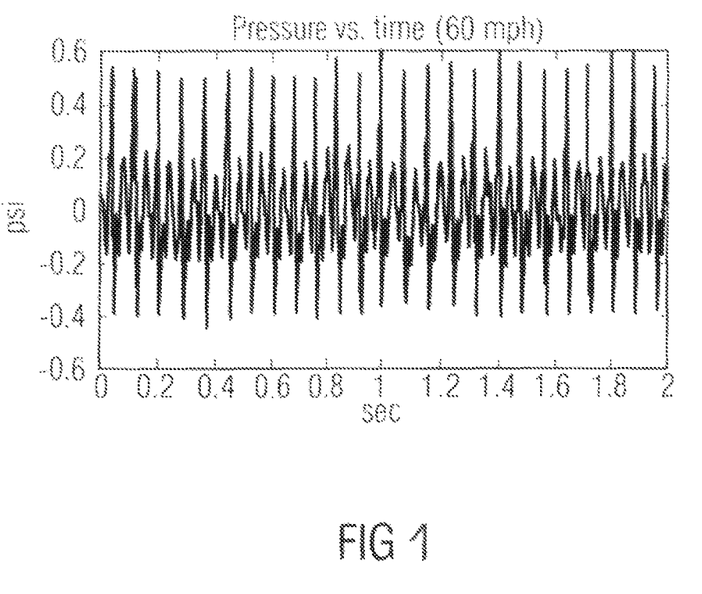
FIG. 1 shows changes in pressure within a tire during rotation of the tire.
Figure 2A:
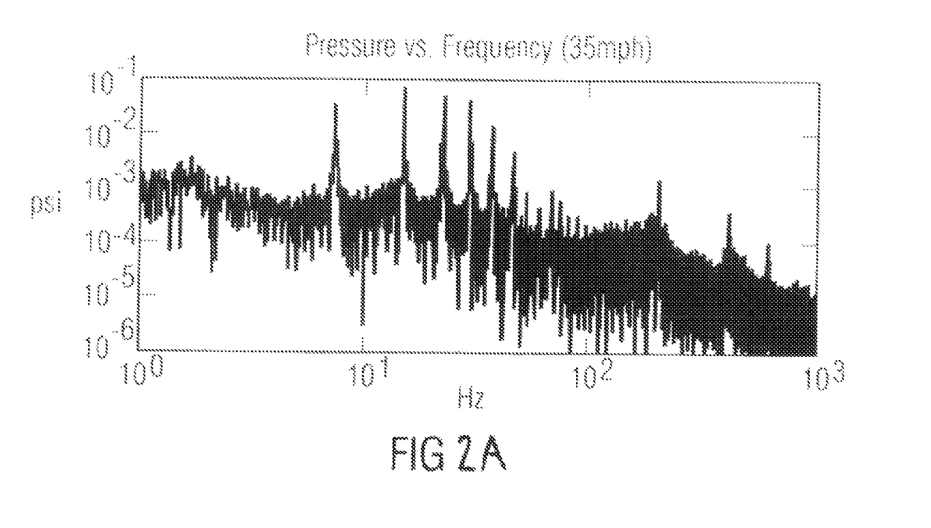
FIGS. 2A and 2B illustrate the amplitude versus frequency spectrum of a pressure signal generated within a rotating tire at 35 mph (FIG. 2A) and at 60 mph (FIG. 2B)
Figure 2B:
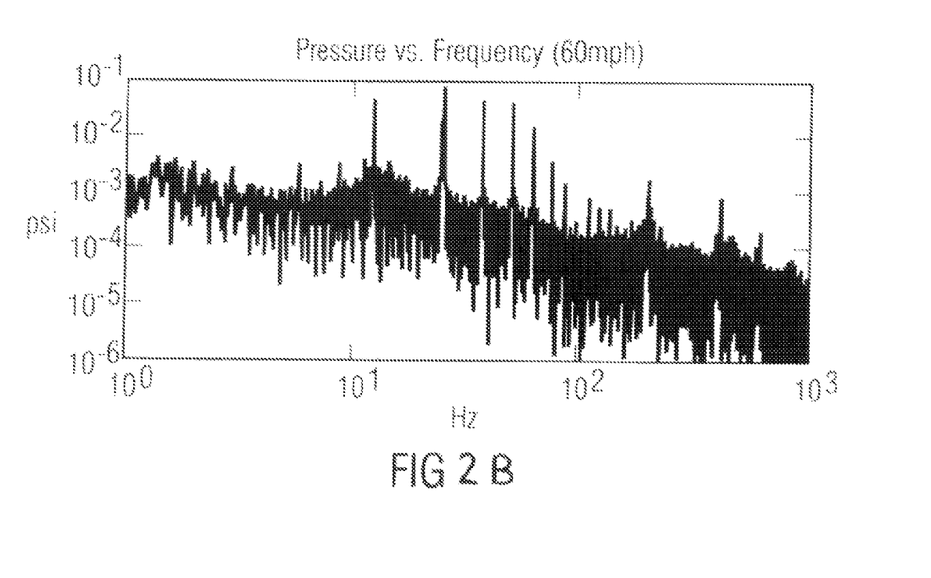

The method is based on the fact that tire pressure measurements display small pressure changes synchronously with a wheel rotation. For example, published patent application US 2007/0074566 A1 shows that there is a pressure change in a rotating tire during motion of the vehicle, which is correlated with the tire revolution. An example of such pressure changes is shown in FIG. 1. The time in seconds is shown along the axis of the abscissa, while the axis of the ordinate plots the pound-force per square inch (psi; 1 psi~6.89 kPa). In that example, the tire is mounted on a wheel of a vehicle moving at 60 mph (miles per hour; approximately 96 km/h). Exemplary plots of spectral analysis (amplitude versus frequency) of pressure changes generated within the rotating tire are shown in FIGS. 2A and 2B for tires mounted on wheels of a vehicle moving at 35 mph (approximately 56 km/h) (FIG. 2A) and 60 mph (FIG. 2B). In FIGS. 2A and 2B, the frequency (in Hz) is denoted on the axis of the abscissa, while on the axis of ordinate the pound-force per square inch is shown. As can be seen, the amplitude peaks comprise the fundamental rotation frequency and its harmonics, which correspond to the rotating, rolling frequency of the tire. Consequently, these pressure changes can be used to provide angular information of the wheel.

Thus, no further transducer, other than the tire pressure sensor, is needed to obtain rotation information and, therefore, the present invention provides a method for determining a rotation angle of at least one wheel of a vehicle during an operation of the vehicle, in particular for TPMS localization, without the need of an additional sensor other than the tire pressure sensor within a TPMS WU. This leads to reduced hardware complexity and cost for the WU.

The step of determining a rotation angle of the at least one wheel may further include determining a revolution period of the at least one wheel. A wheel unit typically transmits at a fixed rotation position of the wheel a signal intended for the electronic control unit. Determining a revolution period of the at least one wheel may advantageously be used for determining the fixed rotation position. Moreover, an adaptive sampling method may be used based on the determined revolution period to provide a constant number of samples per revolution of the wheel, irrespective of the wheel rotating speed, and to allow efficient data evaluation, for example filtering.

The step of determining a rotation angle of the at least one wheel may further comprise one or more additional steps.

According to one embodiment, an average pressure value of the determined plurality of pressure values is calculated.

According to a further embodiment, pressure differences are calculated by subtracting from the determined plurality of pressure values the average pressure value or a pressure value of the determined plurality of pressure values. This may advantageously improve the relative dynamic range of the signal.

Further, a filtered pressure signal may be determined by at least one of subtracting the average pressure value and/or by high-pass filtering, which can also remove low-frequency parasitic noise in the signal.

Also, a low-pass filtering may be applied to determine a filtered signal, thereby removing high-frequency parasitic noise in the sensed signal.

According to another embodiment, zero-lag filtering is performed to determine a filtered signal, thereby enabling preservation of the phase information despite the possible range of frequencies of the pressure signal.

According to one embodiment, the rotation angle is obtained by performing a positive peak value detection of the determined plurality of pressure values, of the calculated pressure differences and/or of the filtered signal.

According to another embodiment, the rotation angle is obtained by performing a negative peak value detection of the determined plurality of pressure values, of the calculated pressure differences and/or of the filtered signal.

Further, the rotation angle may be obtained by performing a zero crossing detection of the filtered pressure signal.

According to one embodiment, autocorrelation/auto covariance of the determined plurality of pressure values and/or of the calculated pressure differences is performed to provide angular information.

Angular information may be obtained by performing Fourier or another spectral analysis on the pressure signal.

According to one embodiment, the angular information, i.e. the rotation angle of the at least one wheel, and possibly various possible reference positions is retrieved using a phase-lock loop (PLL).

The tire pressure sensor may be mounted on an inner-liner opposite to a tire tread of the tire. According to one embodiment, a wheel unit comprising the tire pressure sensor may be attached to the inner-liner at tire manufacturing. According to another embodiment, the wheel unit may be attached or glued to the inner-liner by a workshop or tire dealer, independently of the tire manufacturer. In this way, the wheel unit with the tire pressure sensor becomes an aftermarket product.

A computer program product is also provided that comprises code tangibly embodied thereon, that when executed on a processor, causes the processor to perform the method of one of the embodiments described above.

With the above and other objects in view there is also provided, in accordance with the invention, a system for determining a rotation angle of at least one wheel of a vehicle during an operation of the vehicle, in particular during a motion of the vehicle. The system comprises a tire pressure sensor for determining a plurality of pressure values of a pressure of a tire of the at least one wheel. The system further comprises a determining means for determining a rotation angle of the at least one wheel by determining a change of the pressure of the tire based on the determined plurality of pressure values.

Thus, no further transducer, other than the tire pressure sensor, is needed to get rotation information and, therefore, the present invention provides a system for determining a rotation angle of at least one wheel of a vehicle during an operation of the vehicle, in particular for TPMS localization, without the need of an additional sensor other than the tire pressure sensor within a TPMS WU. This leads to reduced hardware complexity and cost for the WU.

The tire pressure sensor may be attached to a tire innerliner opposite to a tire tread. According to one embodiment, the tire pressure sensor may be attached to the inner-liner at tire manufacturing. According to another embodiment, the tire pressure sensor may be attached or glued to the innerliner by a workshop or tire dealer, independently of the tire manufacturer. This way, the tire pressure sensors/TPMS become an aftermarket product. The tire pressure sensor is typically part of a wheel unit (WU).

Further, the determining means may comprise an analog/digital converter (ADC) for sampling the determined plurality of pressure values. Sampling frequency and pressure resolution are typically selected to capture the pressure change. Also the determining means may comprise a digital processor, or digital processing device, for determining the rotation angle of the at least one wheel. There are several ways to accomplish the digital processing of the determined plurality of pressure values.

According to one embodiment, the digital processor is adapted for calculating an average pressure value of the determined plurality of pressure values.

According to a further embodiment, the digital processor is adapted for calculating pressure differences by subtracting from the determined plurality of pressure values the average pressure value or a pressure value of the determined plurality of pressure values, thus improving the relative dynamic range of the signal.

The digital processor may further include a digital filter to obtain a filtered signal of the determined plurality of pressure values.

The digital filter may be a high-pass filter, in particular adapted for removing the average pressure value of the determined plurality of pressure values and high-frequency parasitic noise in the pressure signal.

Also, a digital low-pass filter may be used, to remove low-frequency parasitic noise in the sensed pressure signal.

According to another embodiment, a zero-lag filter is used, to enable preservation of the phase information despite the possible range of frequencies of the pressure signal.

According to one embodiment, the digital processor is adapted for performing a positive peak value detection for determining the rotation angle of the at least one wheel. In particular, the digital processor may be adapted for performing a peak detection algorithm stored in the wheel unit to obtain the rotation angle of the at least one wheel by performing positive peak (maximum) detection of the pressure signal, i.e. of the determined plurality of pressure values, of the calculated pressure differences or of the filtered signal.

Further, the digital processor may be adapted for performing a negative peak value detection for determining the rotation angle of the at least one wheel. In particular, the digital processor may be adapted for performing a peak detection algorithm stored in the wheel unit to obtain the rotation angle of the at least one wheel by performing negative peak (minimum) detection of the pressure signal, i.e. of the determined plurality of pressure values, of the calculated pressure differences or of the filtered signal.

According to one embodiment, the digital processor is adapted for performing a zero crossing detection for determining the rotation angle of the at least one wheel. In particular, the digital processor may be adapted for performing a detection algorithm stored in the wheel unit that performs zero crossing detection of the filtered pressure signal.

According to one embodiment, instead of, or besides the filtering and the detection algorithm, the digital processor may include calculating means to perform autocorrelation/auto covariance of the pressure signal, i.e. of the determined plurality of pressure values, to provide angular information and possibly the period of the tire revolution.

The digital processor may obtain angular information and possibly the period of the tire revolution by performing Fourier or other spectral analysis on the pressure signal.

In a further embodiment, the digital processor comprises means for performing spectral analysis on the determined plurality of pressure values for determining the rotation angle of the at least one wheel.

Further, the digital processor may include means for detecting a revolution period of the at least one wheel, i.e. means to estimate the period of the tire revolution, and for performing adaptive sampling, providing a constant number of samples per period, irrespective to the wheel rotating speed, allowing efficient data evaluation, for example band pass filtering on the constant resulting frequency.

According to another embodiment, the determining means may comprise an analog filter for obtaining a filtered signal of the determined plurality of pressure values and is adapted for performing an analog peak detection and/or for performing a zero-crossing detection for determining the rotation angle of the at least one wheel. Thus, analog signal processing of the pressure signal may be used to determine the rotation angle of the at least one wheel, too.

Other features which are considered as characteristic for the invention are set forth in the appended claims.

Although the invention is illustrated and described herein as embodied in a method and system for determining a rotation angle of at least one wheel of a vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 3:
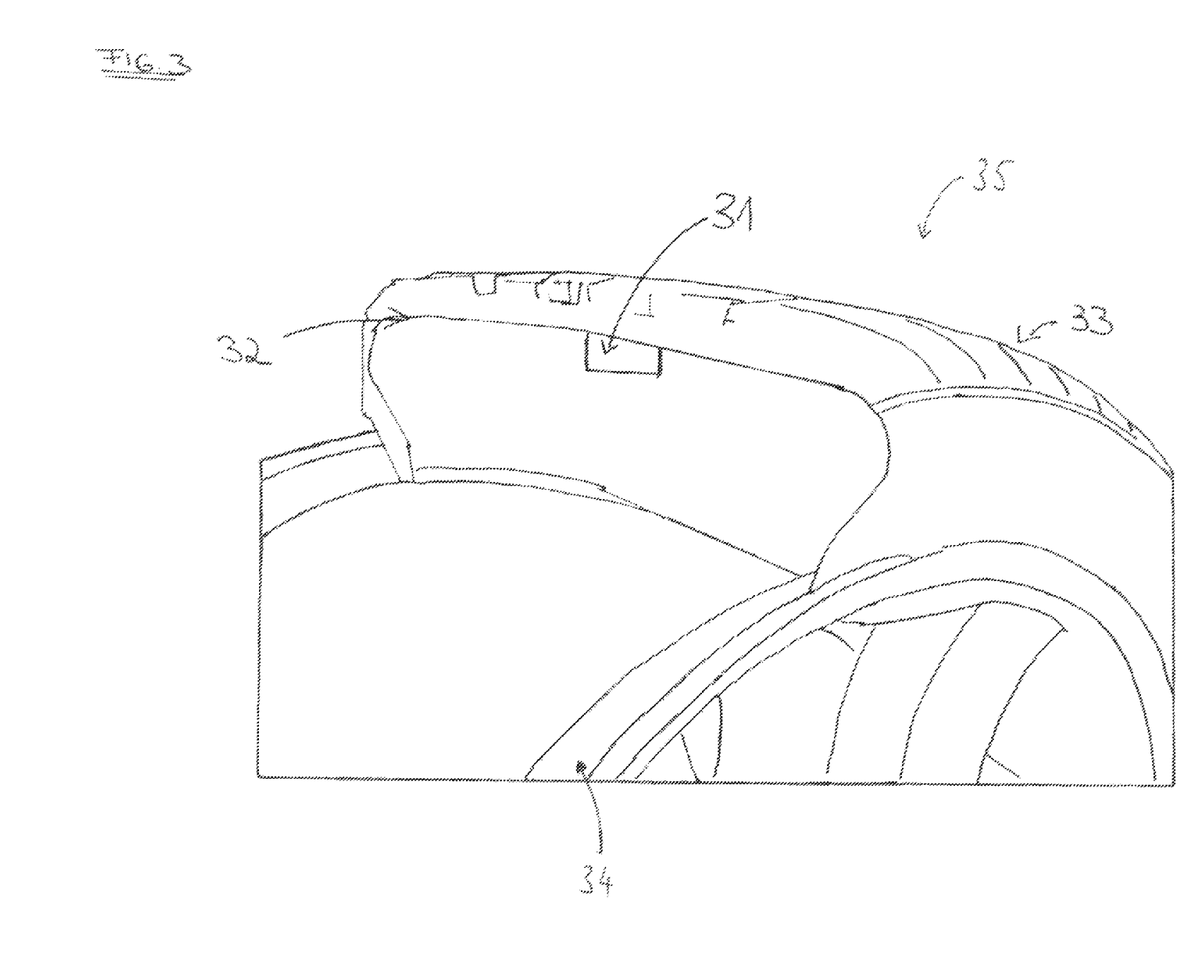
FIG. 3 shows a TPMS wheel unit (WU) that is attached to an inner-liner of a tire.

Referring now once more to the figures of the drawing in detail and first, particularly, to FIG. 3 thereof, there is shown a TPMS wheel unit WU 31 that is attached to an inner-liner 32 of a tire 33 mounted on a rim 34 of a wheel 35 of a vehicle. The wheel unit 31, which includes a pressure sensor, is attached to the tire inner-liner 32 opposite from a tire tread of the tire 33. For reasons of clarity, the pressure sensor and the vehicle are not illustrated in detail in FIG. 3 and the tire 33, the rim 34 and the wheel 35 are only illustrated partially. The vehicle typically is a motor vehicle, for example a passenger car or a heavy duty vehicle.

Figure 4:
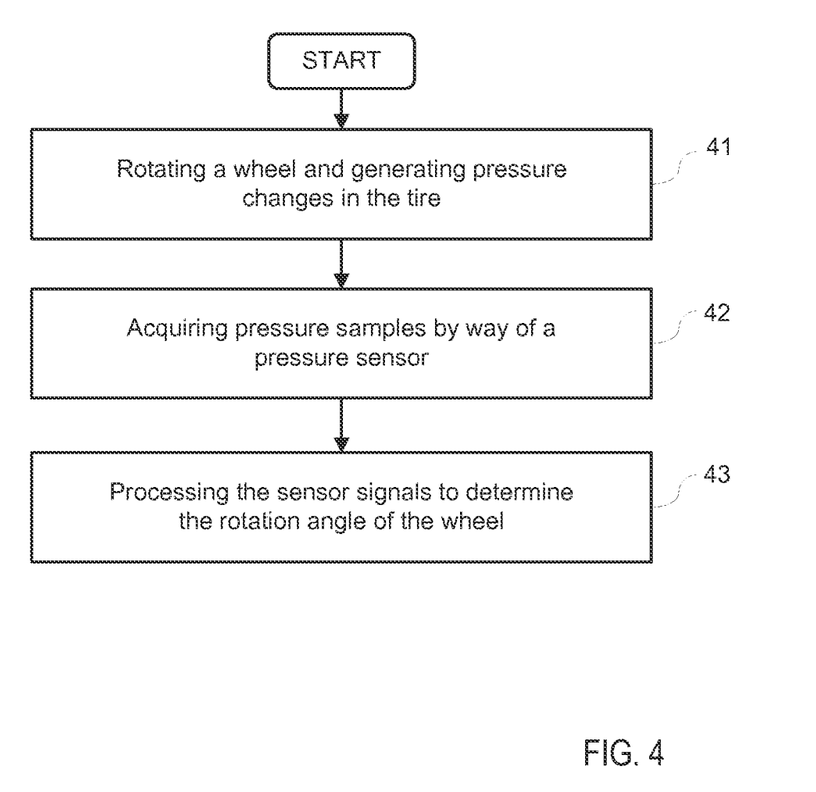
FIG. 4 is a flowchart illustrating a method for determining a rotation angle of at least one wheel of a vehicle during an operation of the vehicle according to an exemplary embodiment of the present invention.

FIG. 4 illustrates a flow diagram illustrating a method 40 for determining a rotation angle of at least one wheel of a vehicle during an operation of the vehicle according to an embodiment of the present invention.

Therein, the step indicated by 41 corresponds to the process of rotating the wheel on a surface during a movement of the vehicle, thereby generating pressure changes in a tire mounted on the wheel. The step indicated by 42 corresponds to acquiring pressure samples by a tire pressure sensor, i.e. a tire pressure sensor determines a plurality of pressure values, the single pressure values being determined consecutively at different times, i.e. being determined one after another at different points in time. The step indicated by 43 is generic for the processing of the pressure signal to determine the rotation angle. Therein, several specific steps which have been previously described above may be used.

FIG. 5 shows wheel unit (WU) 1 implementations for performing methods according to embodiments of the present invention. Therein, FIGS. 5A, 5B, 5C and 5D show digital implementations, whereas FIG. 5E shows an analog implementation of the WU 1.

According to FIGS. 5A to 5E, each of the illustrated wheel units (WU) 1 is embedded in a wheel of a vehicle. For reasons of clarity, the wheel and the vehicle are not illustrated in detail in FIGS. 5A to 5E. Each of the illustrated wheel units 1 is part of a tire pressure monitoring system (TPMS) and comprises a tire pressure sensor 2 which is adapted for determining a plurality of pressure values of a pressure of a tire of the wheel. In the illustrated embodiments, the tire pressure sensor 2 is adapted for determining a plurality of gas pressure values of a gas pressure of the tire. The tire pressure sensor 2 is thus established for acquiring pressure samples with appropriate sampling speed and resolution such that a pressure change can be detected during an operation of the vehicle and, thus, when the wheel, in which the wheel unit 1 is embedded, is running on a surface, for example on a road, during a motion of the vehicle. Therein each of the shown wheel units 1 further comprises a determining means for determining a rotation angle by processing the pressure signal.

Within each of the shown WUs 1 in FIGS. 5A to 5D, which involve digital processing, the determining means for determining a rotation angle by processing the pressure signal comprises an analog to digital converter (ADC) 3 for sampling the sensed pressure.

Figure 5A:
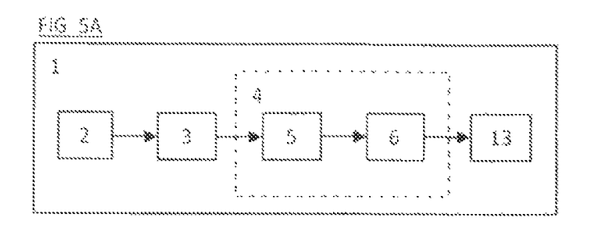
FIGS. 5A, 5B, 5C, 5D, and 5E illustrate several wheel unit implementations for performing a method according to an embodiment of the present invention.

The determining means of the WU 1 shown in FIG. 5A further comprises a digital processor or processing device 4, which comprises a digital filter 5, such as a high-pass filter or a low-pass filter, for obtaining a filtered signal of the sensed pressure signal and which uses a maximum/minimum peak detection and/or zero-crossing detection algorithm 6 stored within the wheel unit 1 for obtaining the rotation angle. There is further shown a transmission means 13 for transmitting the rotation angle to an electronic control unit (ECU) of the TPMS mounted on or in a non-rotating part of the vehicle. For reasons of clarity, the electronic control unit is not illustrated in detail in FIGS. 5A to 5E.

Figure 5B:
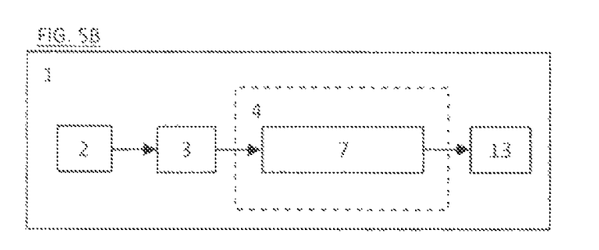

The determining means of the WU 1 shown in FIG. 5B further comprises a digital processor 4, which uses an autocorrelation/auto covariance calculating algorithm 7 stored within the wheel unit 1 for obtaining the rotation angle. There is further shown a transmission means 13 for transmitting the rotation angle to an electronic control unit of the TPMS.

Figure 5C:
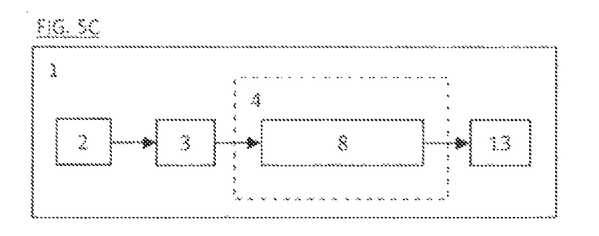

The determining means of the WU 1 shown in FIG. 5C further comprises a digital processor 4, which uses a Fourier or another spectral analysis algorithm 8 stored within the wheel unit 1 for obtaining the rotation angle. There is further shown a transmission means 13 for transmitting the rotation angle to an electronic control unit of the TPMS.

Figure 5D:
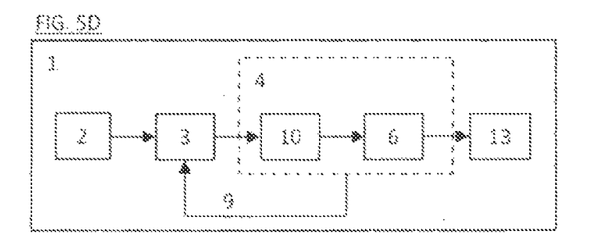

The determining means of the WU 1 shown in FIG. 5D further comprises a digital processor 4, which comprises a digital filter 10, such as a high-pass, low-pass or a band-pass filter, for obtaining a filtered signal of the sensed pressure signal and a maximum/minimum peak detection and/or zero-crossing detection algorithm 6 for obtaining the rotation angle. Further, the digital processing device includes means 9 coupled to the analog to digital converter 3 for detecting a revolution period of the wheel, i.e. means to estimate the period of the tire revolution, and for performing adaptive sampling, i.e. for providing a constant number of samples per period, irrespective of the wheel rotating speed by adjusting the sampling rate of the analog to digital converter 3. There is further shown a transmission means 13 for transmitting the rotation angle to an electronic control unit of the TPMS.

Figure 5E:
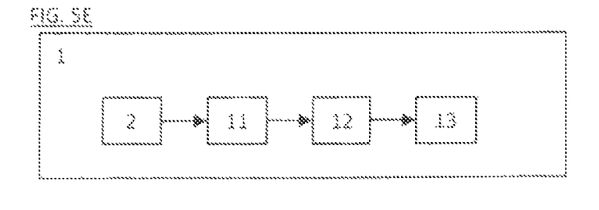

The determining means within the analog WU 1 shown in FIG. 5E further comprises analog processing device comprising an analog filter 11 for obtaining a filtered signal of the sensed pressure signal and using an analog peak detection and/or zero-crossing detection algorithm 12 stored within the wheel unit 1 for obtaining the rotation angle. There is further shown a transmission means 13 for transmitting the rotation angle to an electronic control unit of the tire pressure monitoring system (TPMS).

Thus, according to the embodiments shown in FIGS. 5A to 5E, no further transducer, other than the tire pressure sensor 2, is needed to obtain rotation information inside the WU 1 and, therefore, a system for determining a rotation angle of at least one wheel of a vehicle, in particular for TPMS localization, is provided without the need of an additional sensor other than the tire pressure sensor 2 within a WU 1. This leads to reduced hardware complexity and cost for the WU 1.

The invention claimed is:

1. A method of determining a rotation angle of at least one wheel of a vehicle during an operation of the vehicle, the method comprising:
   acquiring, with a tire pressure sensor, a plurality of pressure values of a pressure in a tire of the at least one wheel; and
   determining a rotation angle of the at least one wheel by determining a change of a pressure in the tire based on the determined plurality of pressure values.

2. The method according to claim 1, wherein the step of determining the rotation angle of the at least one wheel includes determining a revolution period of the at least one wheel.

3. The method according to claim 1, wherein the step of determining a rotation angle of the at least one wheel further comprises:
   calculating an average pressure value of the determined plurality of pressure values;
   calculating pressure differences by subtracting from the determined plurality of pressure values the average pressure value or a pressure value of the determined plurality of pressure values;
   determining a filtered signal by at least one process selected from the group consisting of subtracting the average pressure value, high-pass filtering, low-pass filtering, and zero-lag filtering;
   performing a positive peak value detection or a negative peak value detection of the determined plurality of pressure values, of the calculated pressure differences and/or of the filtered signal;
   performing a zero crossing detection of the filtered signal;
   calculating autocorrelation and/or auto covariance of the determined plurality of pressure values and/or of the calculated pressure differences.

4. The method according to claim 1, wherein the step of determining the rotation angle of the at least one wheel further comprises using a phase-lock loop.

5. A computer program product, comprising computer-executable code stored in non-transitory form and configured, when executed on a processor, to cause the processor to perform the method according to claim 1.

6. A system for determining a rotation angle of at least one wheel of a vehicle during an operation of the vehicle, the system comprising:
   a tire pressure sensor for acquiring a plurality of pressure values of a tire pressure in a tire of the at least one wheel; and
   a determining device for determining a rotation angle of the at least one wheel by determining a change of the pressure of the tire based on the plurality of pressure values acquired by the tire pressure sensor.

7. The system according to claim 6, wherein said determining device comprises an analog/digital converter for sampling the acquired plurality of pressure values and a digital processor for determining the rotation angle of the at least one wheel.

8. The system according to claim 7, wherein said digital processor is configured for calculating an average pressure value of the determined plurality of pressure values.

9. The system according to claim 8, wherein said digital processor is configured for calculating pressure differences by subtracting from the determined plurality of pressure values the average pressure value or a pressure value of the determined plurality of pressure values.

10. The system according to claim 7, wherein said digital processor comprises a digital filter for obtaining a filtered signal, said digital filter having one or more filters selected from the group consisting of a digital high-pass filter, a digital low-pass filter, and a zero-lag filter.

11. The system according to claim 7, wherein said digital processor is configured for performing a positive peak value detection or a negative peak value detection of the acquired plurality of pressure values and/or for performing a zero crossing detection for determining the rotation angle of the at least one wheel.

12. The system according to claim 7, wherein said digital processor comprises calculating means for performing auto-correlation and/or auto covariance of the acquired plurality of pressure values.

13. The system according to claim 7, wherein said digital processor comprises means for performing spectral analysis on the acquired plurality of pressure values for determining the rotation angle of the at least one wheel.

14. The system according to claim 7, wherein said digital processor comprises means for detecting a revolution period of the at least one wheel.

15. The system according to claim 6, wherein said determining device comprises an analog filter for obtaining a filtered signal of the acquired plurality of pressure values and said determining device is configured for performing at least one of an analog peak detection and/or a zero-crossing detection for determining the rotation angle of the at least one wheel.

* * * * *